US012321753B2

(12) United States Patent
Sayyed et al.

(10) Patent No.: US 12,321,753 B2
(45) Date of Patent: Jun. 3, 2025

(54) BIOS-INSTRUMENTED FIRMWARE STATE FOR HARD DRIVE REPAIR/REPLACE ASSURANCE

(71) Applicant: Dell Products L.P., Round Rock, TX (US)

(72) Inventors: Ibrahim Sayyed, Georgetown, TX (US); Amit Kumar Tiwari, Austin, TX (US); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 38 days.

(21) Appl. No.: 18/305,381

(22) Filed: Apr. 24, 2023

(65) Prior Publication Data

US 2024/0354113 A1 Oct. 24, 2024

(51) Int. Cl.
| | | |
|---|---|---|
| *G06F 9/4401* | (2018.01) | |
| *G06F 8/60* | (2018.01) | |
| *G06F 8/61* | (2018.01) | |
| *G06F 9/445* | (2018.01) | |
| *G06F 11/30* | (2006.01) | |

(52) U.S. Cl.
CPC ........ *G06F 9/4401* (2013.01); *G06F 11/3034* (2013.01); *G06F 8/60* (2013.01); *G06F 8/61* (2013.01); *G06F 9/4403* (2013.01); *G06F 9/445* (2013.01)

(58) Field of Classification Search
CPC . G06F 9/4401; G06F 8/61; G06F 8/60; G06F 9/4403; G06F 9/445; G06F 11/3034
USPC ................................ 713/1, 2, 100; 717/174
See application file for complete search history.

(56) References Cited

U.S. PATENT DOCUMENTS

| | | | | |
|---|---|---|---|---|
| 7,054,937 | B1 * | 5/2006 | Milne | H04L 67/06 709/227 |
| 7,480,793 | B1 * | 1/2009 | Marsh | G06F 11/1417 713/1 |
| 9,342,316 | B1 * | 5/2016 | Sivertsen | G06F 9/4406 |
| 2012/0198219 | A1 * | 8/2012 | Preimesberger | G06F 9/4411 713/2 |
| 2015/0095904 | A1 * | 4/2015 | Ahmadi-Ardakani | G06F 8/63 717/177 |
| 2015/0286546 | A1 * | 10/2015 | Brethauer | H04L 67/1095 714/6.3 |

\* cited by examiner

*Primary Examiner* — Ji H Bae
(74) *Attorney, Agent, or Firm* — Jackson Walker L.L.P.

(57) ABSTRACT

Disclosed methods include initiating a system basic I/O system (BIOS) and, responsive to detecting an empty drive, accessing evaluating local BIOS telemetry data associated with installation of a new drive. Upon determining that the BIOS telemetry data a specified criteria, a long disk self-test (DST) and a short DST, may be performed. If the DSTs generate no hardware errors, hard drive service data including, for example, call log and service tag history associated with the information handling system, may be retrieved from a cloud backend to authorize an OS installation. Upon approving an OS installation, a service operating system (SOS) image may be retrieved from an OEM backend and a special key operable to cause a startup service of the SOS to boot to an OS installation flow may be accessed from a firmware volume in SPI flash to enable the SOS to initiate an OS installation flow.

18 Claims, 4 Drawing Sheets

BIOS-INSTRUMENTED FIRMWARE STATE FOR HARD DRIVE REPAIR/REPLACE ASSURANCE

TECHNICAL FIELD

The present disclosure pertains to information handling systems and, more specifically, information handling system hard drives.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hard drives are a critically important source of storage in many information handling systems. The two most common types of hard drives are ferromagnetic based hard disk drives (HDDs) and semiconductor based solid state drive (SSDs). Hard drives may fail for numerous reasons including, as examples, firmware faults, corrupted files, and electrical failures. Such failures may cause a hard drive to become undetectable in BIOS to load bootloaders and unable to read/write files.

In some cases, diagnostic tests are required to detect hard drive issues. Two well-known diagnostic tests for hard drives, commonly referred to as Long disk self-test (DST) and Short DST, generate error codes indicating specific issues that cause disk failures. These error codes may be pushed to a backend where dispatch routines may investigate the error codes. If the failure is attributable to a hardware error that available repair routines are not unable to resolve, a replacement drive may be sent to the customer.

Generally, the installation and configuration of a replacement drive by a customer is a largely manual process that is subject to uncertainty and delay, particularly in situations where there is a problem with the replacement disk.

SUMMARY

Common problems associated with customer assurance following hard drive installations/replacements are addressed herein by disclosed systems and methods including, in one aspect, an information handling system boot method that includes initiating a system basic I/O system (BIOS) and, responsive to detecting an empty drive, accessing and evaluating local telemetry data. The local telemetry data may include BIOS telemetry data associated with installation of a new drive. Upon determining that the BIOS telemetry data satisfies one or more predetermined or otherwise specified criteria one or more DSTs, e.g., a long DST and a short DST, may be performed on the newly installed drive. If the DSTs generate no hardware errors, hard drive service data including, for example, call log and service tag history associated with the information handling system, may be retrieved to verify a request for an OS installation associated with the hard drive, e.g., verifying the platform and warranty criteria. This data may be retrieved from a cloud backend telemetry. Upon verifying the OS install request, a service operating system (SOS) may be retrieved from an OEM backend. A special key file including a special key operable to cause a startup service of the SOS to boot to an OS installation flow may be accessed from a firmware volume in SPI flash to enable a startup service of the SOS to invoke an OS install flow. The SOS may then be launched to initiate an OS provisioning on the hard drive. In at least some embodiments, the method may detect a boot failure in combination with an indicator of a new image. The method may then extracting local telemetry data and pushing the local telemetry data to a backend store before guiding a user to contact an information technology (IT) administrator.

The BIOS telemetry data associated with installation of a new drive may include any one or more of an empty drive indicator, a chassis intrusion indicator, a no bootable image indicator, and an HDD wipe indicator indicative of a NIST-compliant hard drive wipe occurring in a previous boot cycle. The specified criteria for branch to the OS installation flow may be satisfied when each of the BIOS telemetry indicators is true. Retrieving the SOS may include establishing connectivity with an original equipment manufacturer (OEM) backend and retrieving the SOS from the OEM backend.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
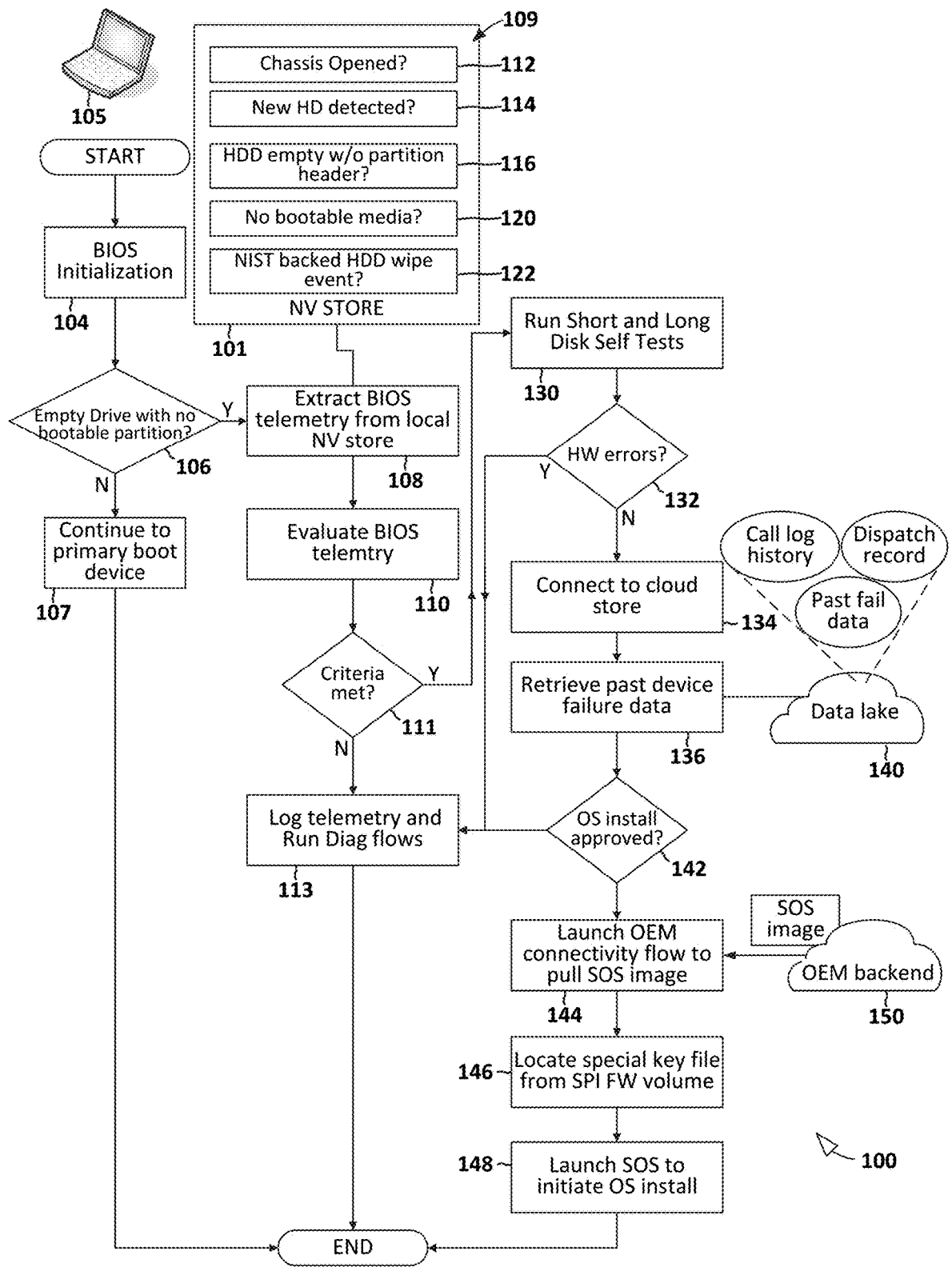
FIG. 1 illustrates a flow diagram of a BIOS-instrumented method for customer assurance pertaining to a hard drive installation/replacement.

Exemplary embodiments and their advantages are best understood by reference to FIGS. 1-5, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates a flow diagram of a BIOS-instrumented firmware state method 100 of assuring new or replacement hard drives in accordance with disclosed teachings. The method 100 illustrated in FIG. 1 begins following a system reset such as the power on (step 102) illustrated in FIG. 1, which triggers execution of a BIOS including a BIOS initialization (step 104). During an early stage of the BIOS, the illustrated method 100 determines (step 106) whether SUT 105 includes an empty drive having no bootable partition. In at least some embodiments, the BIOS is executed in accordance with a Universal Extensible Firmware Interface (UEFI) and the early stage of the BIOS may refer to a UEFI Pre EFI Initialization (PEI) phase. Detection of the empty drive state may be facilitated by BIOS telemetry, implemented by the original equipment manufacturer (OEM), including BIOS event logs and diagnostic logging. Examples of BIOS telemetry suitable for facilitating customer assurance following a hard drive installation/replacement are provided herein. If no empty drive is detected, the illustrated method 100 continues (step 107) to boot to primary boot device.

If an empty drive is detected at step 106, method 100 extracts (step 108) and evaluates (step 110) BIOS telemetry data 109 from a Serial Peripheral Interface (SPI) flash memory device 101 or another type of non-volatile (NV) storage resource of SUT 105. In at least some embodiments, local BIOS telemetry data 109 includes telemetry data indicative of or otherwise pertaining to events or states associated with hard drives. As examples, the local BIOS telemetry data 109 illustrated in FIG. 1 includes chassis opened data 112, indicative of whether the chassis was opened, new drive data 114, indicative of whether a new hard drive has been installed detected, empty drive data 116, indicative of whether a drive is empty without a partition header, bootable media data 120, indicative of whether a drive has no bootable media, and hard drive wipe data 122, indicative of whether a National Institute of Standards and Technology (NIST)-compliant hard disk drive wipe event has occurred. Although FIG. 1 illustrates a specific group of a BIOS telemetry parameters, those of ordinary skill in the field will appreciate that other implementations of method 100 may employ more, fewer, and/or different BIOS telemetry parameters.

If, as determined in step 111, the BIOS telemetry data 109 does not meet any of one or more predetermined or otherwise specified criteria, the illustrated method 100 logs the telemetry and runs (step 113) diagnostic testing on the faulting hard drive. If, however, a boot fail occurs and the BIOS telemetry data satisfies any of the one or more criteria, method 100 executes (step 130) one or more DSTs. As depicted in FIG. 1, the DSTs executed may include a short DST and a long DST, both of which will be familiar to those of ordinary skill in hard drive technology. If, as determined in step 132, the DST testing produces hardware errors, method 100 branches to step 113 to log the telemetry data and run diagnostic flows.

If the DST testing in step 130 produce no hardware errors, the illustrated method then connects (step 134) with a cloud-based data lake 140 to retrieve (step 136) historical device failure data. The historical failure data retrieved from data lake 140 may include, as examples, image provisioning requests and other information associated with SUT 105 that may be useful for verifying an OS installation. For example, the historical data may include service tag (STAG) call log history, support assist (SA) alerts that have occurred in the past as well as any reports of disk failures or hard drive wipe. Based at least in part on the retrieved data, method 100 determines (step 142) whether an OS installation is valid and approved.

If an OS installation is not approved, method 100 branches to step 113 to log the telemetry and run diagnostic flows. If an OS installation is approved, method 100 launches (step 144) an OEM connectivity flow to pull an SOS image from an OEM backend 150. As depicted in FIG. 1, method 100 locates (step 146) a special file from a firmware (FW) volume of the SPI flash and launches (step 148) an SOS to initiate an OS installation. The special key may serve as one or more flags configured to instruct a start-up service of the SOS to boot to an OS installation flow. The special key may be passed to the SOS by way of an Advanced Configuration and Power Interface (ACPI) table while the system is booting. After the SOS image has been retrieved, the SOS is launched to initiate an OS installation.

Figure 2:
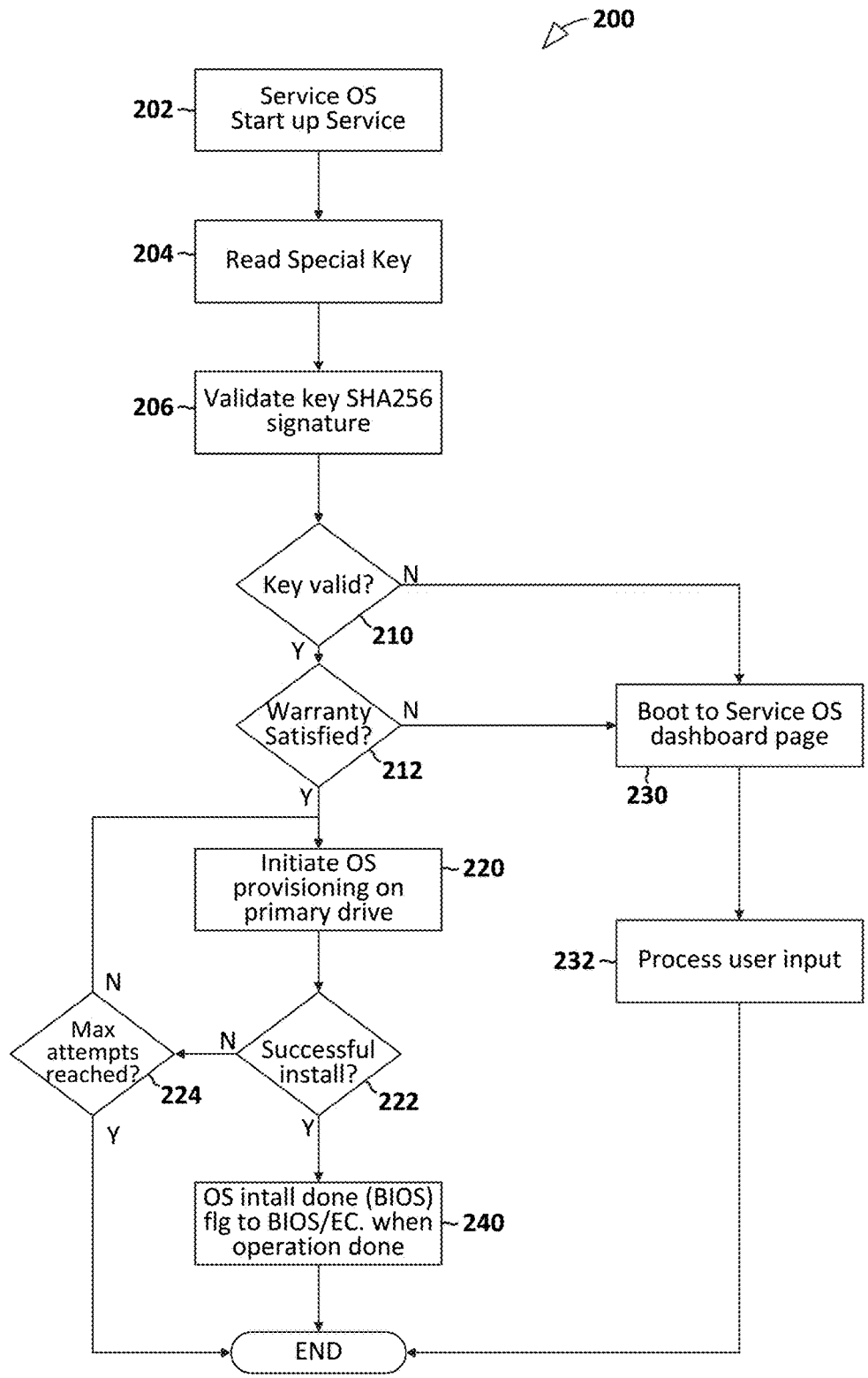
FIG. 2 illustrates a flow diagram of operations performed by an exemplary service operating system in conjunction with the method of FIG. 1.

Turning now to FIG. 2, FIG. 2 illustrates a flow diagram of operations 200 performed by an SOS in combination with BIOS-instrumented elements disclosed herein to provide automated hard drive repair/replace assurance. The operations 200 illustrated in FIG. 2 begin when a startup service of the SOS is invoked by BIOS following a determination that an installation of an OS image is approved. As depicted in FIG. 2, the startup service reads (step 204) a special key from the previously-referenced special key file and attempts to validate (step 206) the key signature. In at least one embodiment, the special key is encrypted with a 256-bit secure hash algorithm (SHA256).

The operations 200 illustrated in FIG. 2 determine (step 210) whether the special key is valid and, if so, determine whether a warranty criteria is satisfied (step 212). If the special key is not valid or the warranty is not satisfied, operations 200 branch to step 232, in which the system is booted to an SOS dashboard page to process (step 232) user input. If the special key is valid and the warranty criteria are satisfied, the operations 200 illustrated in FIG. 2 initiate (step 220) OS provisioning on the primary drive. If (step 222) the OS installation completes successfully, an OS install flag is set (step 240). In at least some embodiments, operations 200 may attempt to initiate OS provisioning two or more times subject to a specified limit on the number of OS installation attempts permitted. Accordingly, the operations 200 illustrated in FIG. 2 may determine (step 224) if the maximum number of installation attempts have been reached and, if not, branching back to step 220 to initiate OS provisioning.

In this manner, BIOS-based hard drive repair/replacement assurance features described herein beneficially leverage resources for automated OS provisioning that would otherwise require a user to perform a non-trivial sequence of operations to re-install the OS.

Figure 3:
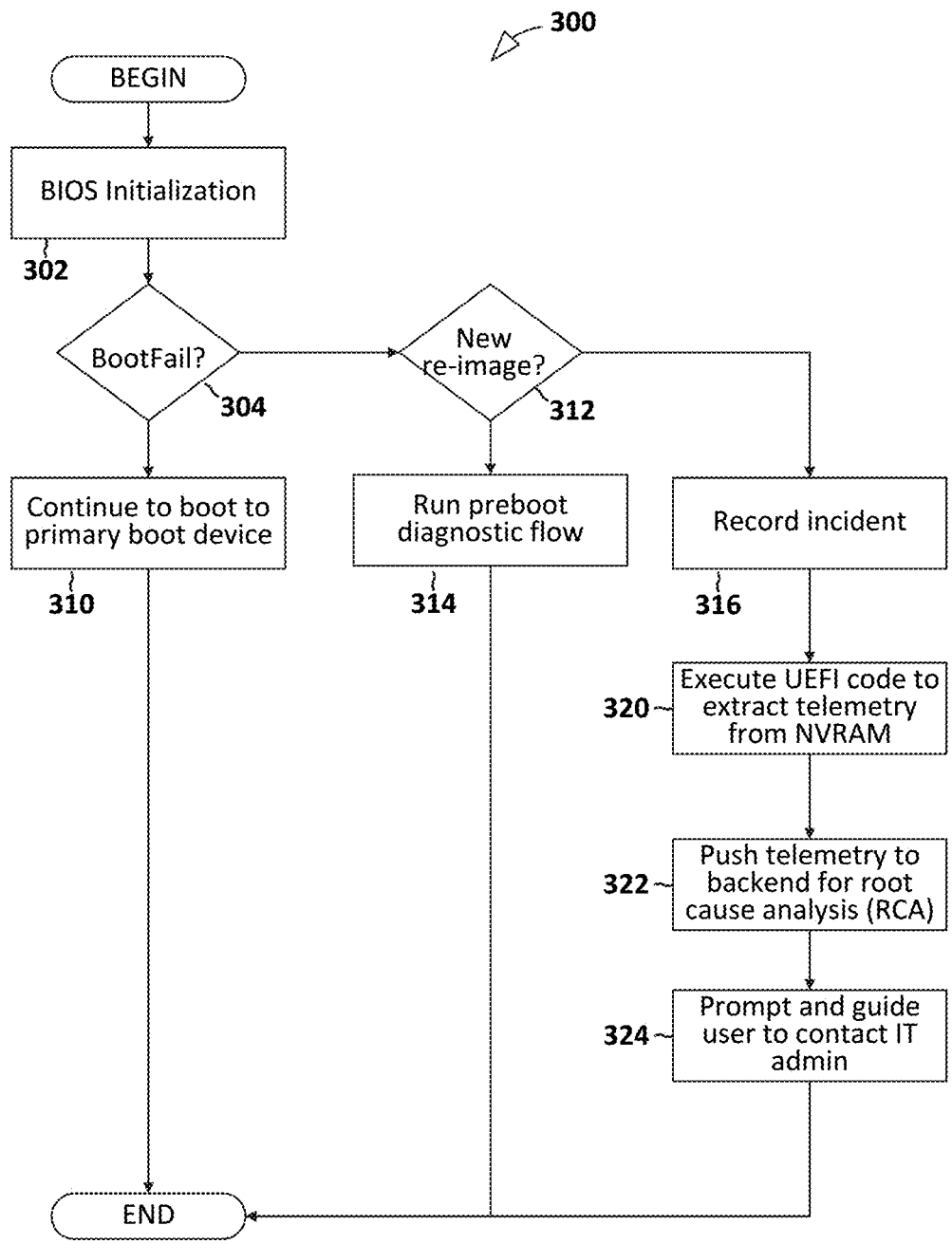
FIG. 3 illustrates a flow diagram for a feature in which detecting and handling a boot failure associated with a newly installed image.

Referring now to FIG. 3, operations 300 suitable for implementing a feature to address boot fails that occur on newly-installed OS images is depicted. As depicted in FIG. 3, operations 300 begin with a BIOS initialization 302. If no boot failure is detected at step 304, the illustrated operations 300 continue (step 310) to boot to the primary boot device. If a boot fail is detected, operations 300 check (step 312) the state of a new image flag. If the new image flag is not set, operations 300 run (step 314) a pre-boot diagnostic. If the new image flag is set, operations 300 record (step 316) the incident, execute (step 320) UEFI code to locate and extract the previously described local telemetry, push (step 322) the telemetry to a back end store for root cause analysis (RCA), and prompt (step 324) the customer to contact IT administration for assistance. The illustrated feature 300 beneficially avoids a recurring flow of unsuccessful re-image attempts when the media appears to be bootable but the image fails to boot.

Figure 4:
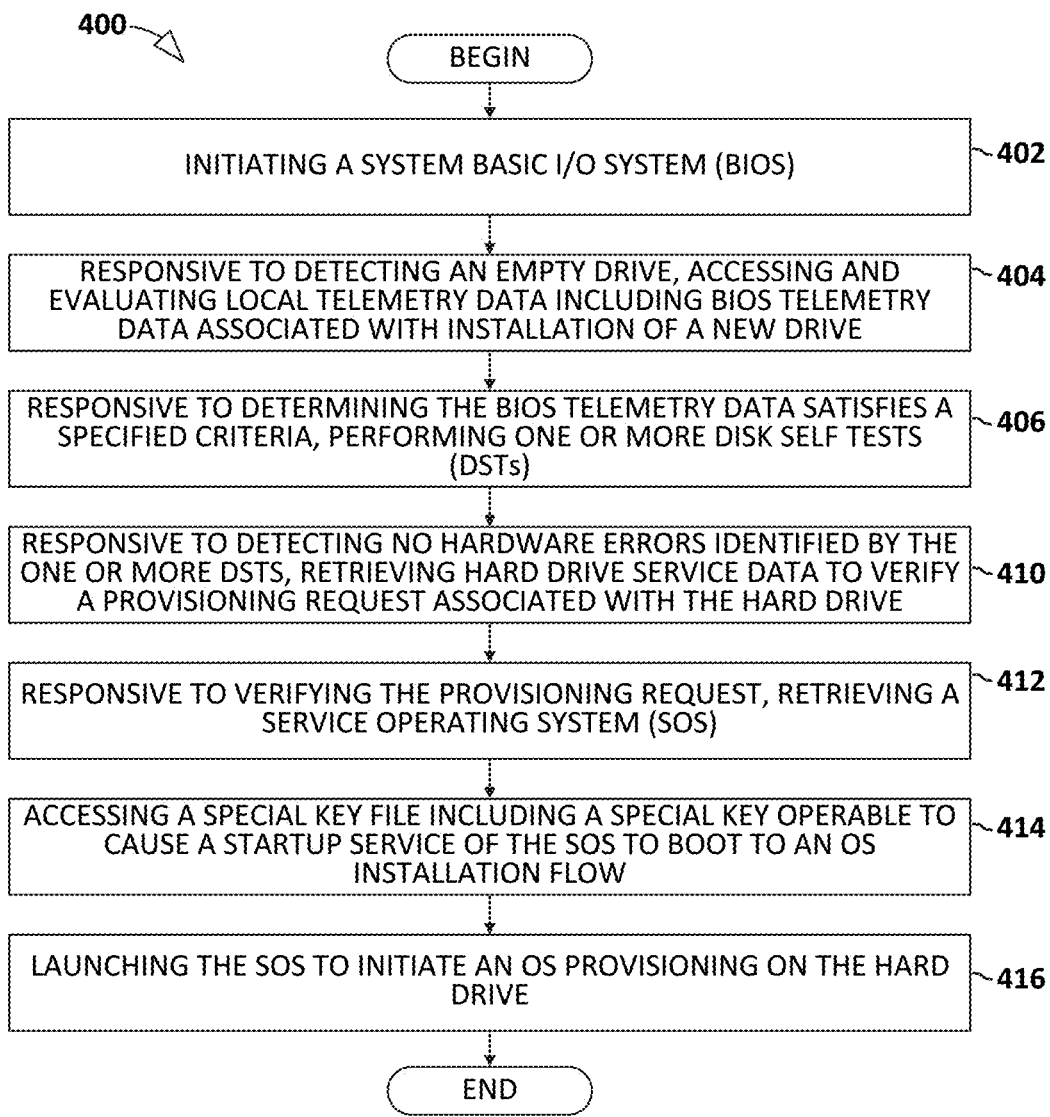
FIG. 4 illustrates a method for implementing customer assurance for hard drive replacements/installations.

Referring now to FIG. 4, a flow diagram illustrates a method 400 for implementing BIOS-instrumented firmware based assurance for hard drive repair/replace. The method 400 illustrated in FIG. 4 include initiating (step 402) a system basic I/O system (BIOS) and responsive to detecting an empty drive, accessing and evaluating (step 404) local telemetry data including BIOS telemetry data associated with installation of a new drive. Upon determining the BIOS telemetry data satisfies a specified criteria, one or more DSTs are performed (step 406). If no hardware errors are generated by the one or more DSTs, hard drive service data associated with the information handling system may be retrieved (step 410) to verify a provisioning request for installing an OS image associated with the hard drive. Responsive to verifying the provisioning request, a service operating system (SOS) may be retrieved (step 412) and a special key file, including a special key operable to cause a startup service of the SOS to boot to an OS installation flow, may be retrieved (step 414). The SOS may be launched (step 416) to initiate an OS provisioning on the hard drive.

Figure 5:
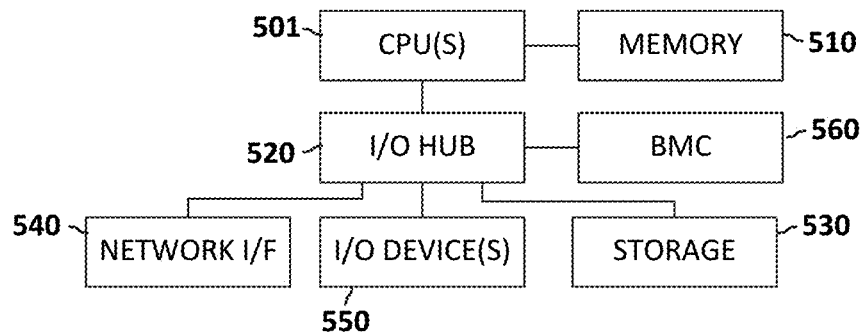
FIG. 5 illustrates a representative information handling system suitable for use in conjunction with features disclosed in FIGS. 1 through 4.

Referring now to FIG. 5, any one or more of the elements illustrated in FIG. 1 through FIG. 4 may be implemented as or within an information handling system exemplified by the information handling system 500 illustrated in FIG. 5. The illustrated information handling system includes one or more general purpose processors or central processing units (CPUs) 501 communicatively coupled to a memory resource 510 and to an input/output hub 520 to which various I/O resources and/or components are communicatively coupled. The I/O resources explicitly depicted in FIG. 5 include a network interface 540, commonly referred to as a NIC (network interface card), storage resources 530, and additional I/O devices, components, or resources 550 including as non-limiting examples, keyboards, mice, displays, printers, speakers, microphones, etc. The illustrated information handling system 500 includes an embedded controller EC 560 may provide or support various system management functions and, in at least some implementations, keyboard controller functions. Exemplary system management function that may be supported by EC 560 include thermal management functions supported by pulse width modulation (PWM) interfaces suitable for controlling system fans, power monitoring functions support by an analog-to-digital (ADC) signal that can be used to monitor voltages and, in conjunction with sense resistor, current consumption per power rail. This information could be used to, among other things, monitor battery charging or inform the user or administrator of potentially problematic power supply conditions. EC 560 may support battery management features to control charging of the battery in addition to switching between the battery and AC adapter as the active power source changes or monitoring the various battery status metrics such as temperature, charge level and overall health. EC 560 may support an Advanced Configuration and Power Interface (ACPI) compliant OS by providing status and notifications regarding power management events and by generating wake events to bring the system out of low power states.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A boot method for an information handling system, wherein the boot method comprises:
   initiating a system basic I/O system (BIOS);
   responsive to detecting an empty drive, accessing and evaluating local telemetry data including BIOS telemetry data associated with installation of a new hard drive;
   responsive to determining the BIOS telemetry data satisfies a specified criteria, performing one or more disk self-tests (DSTs);
   responsive to detecting no hardware errors identified by the one or more DSTs, retrieving hard drive service data associated with the information handling system to verify a provisioning request associated with the hard drive;
   responsive to verifying the provisioning request, retrieving a service operating system (SOS);
   accessing a key file including a key operable to cause a startup service of the SOS to boot to an OS installation flow; and
   launching the SOS to initiate an OS provisioning on the hard drive.

2. The boot method of claim 1, further comprising, responsive to detecting a boot failure in combination with an indicator of a new image:
   extracting the local telemetry data and pushing the local telemetry data to a backend store; and
   guiding a user to contact an information technology (IT) administrator.

3. The boot method of claim 1, wherein the BIOS telemetry data associated with installation of a new hard drive includes one or more of:
   an empty drive indicator;
   a chassis intrusion indicator;
   a no bootable image indicator indicative of a bootable media lacking a bootable image;
   a wipe indicator indicative of a hard drive wipe occurring in a previous boot cycle.

4. The boot method of claim 3, wherein the specified criteria is satisfied when each of the indicators is true.

5. The boot method of claim 1, wherein the hard drive service data includes a service tag (STAG) log history for the information handling system.

6. The boot method of claim 1, wherein retrieving the hard drive service data comprises retrieving the hard drive service data from a telemetry store in a cloud backend.

7. The boot method of claim 1, wherein verifying the provisioning request includes verifying the information handling system and warranty criteria.

8. The boot method of claim 1, wherein retrieving the SOS comprises:
   establishing connectivity with an original equipment manufacturer (OEM) backend; and
   retrieving the SOS from the OEM backend.

9. The boot method of claim 1, wherein accessing the key file comprises retrieving the key file from a firmware volume of nonvolatile random access memory (NVRAM).

10. An information handling system, comprising:
    a central processing unit (CPU); and
    a computer readable memory including instructions that, when executed by the CPU, cause the system to perform boot operations, wherein the boot operations include:
      initiating a system basic I/O system (BIOS);
      responsive to detecting an empty drive, accessing and evaluating local telemetry data including BIOS telemetry data associated with installation of a new hard drive;
      responsive to determining the BIOS telemetry data satisfies a specified criteria, performing one or more disk self-tests (DSTs);
      responsive to detecting no hardware errors identified by the one or more DSTs, retrieving hard drive service data associated with the information handling system to verify a provisioning request associated with the hard drive;
      responsive to verifying the provisioning request, retrieving a service operating system (SOS);
      accessing a key file including a key operable to cause a startup service of the SOS to boot to an OS installation flow; and
      launching the SOS to initiate an OS provisioning on the hard drive.

11. The information handling system of claim 10, wherein the boot operations include, responsive to detecting a boot failure in combination with an indicator of a new image:
    extracting the local telemetry data and pushing the local telemetry data to a backend store; and guiding a user to contact an information technology (IT) administrator.

12. The information handling system of claim 10, wherein the BIOS telemetry data associated with installation of a new hard drive includes one or more of:
   an empty drive indicator;
   a chassis intrusion indicator;
   a no bootable image indicator indicative of a bootable media lacking a bootable image;
   a wipe indicator indicative of a hard drive wipe occurring in a previous boot cycle.

13. The information handling system of claim 12, wherein the specified criteria is satisfied when each of the indicators is true.

14. The information handling system of claim 10, wherein the hard drive service data includes a service tag (STAG) log history for the information handling system.

15. The information handling system of claim 10, wherein retrieving the hard drive service data comprises retrieving the hard drive service data from a telemetry store in a cloud backend.

16. The information handling system of claim 10, wherein verifying the provisioning request includes verifying the information handling system and warranty criteria.

17. The information handling system of claim 10, wherein retrieving the SOS comprises:
   establishing connectivity with an original equipment manufacturer (OEM) backend; and
   retrieving the SOS from the OEM backend.

18. The information handling system of claim 10, wherein accessing the key file comprises retrieving the key file from a firmware volume of nonvolatile random access memory (NVRAM).

* * * * *